(12) United States Patent
Patti et al.

(10) Patent No.: US 11,138,960 B2
(45) Date of Patent: Oct. 5, 2021

(54) SYSTEM AND METHOD FOR A NETWORKED VIRTUAL MUSICAL INSTRUMENT

(71) Applicant: Omnibot Holdings, LLC, El Segundo, CA (US)

(72) Inventors: Michael G. Patti, Los Angeles, CA (US); Christian J. Hessler, Westminster, CO (US)

(73) Assignee: Cinesamples, Inc., El Segundo, CA (US)

( * ) Notice: Subject to any disclaimer, the term of this patent is extended or adjusted under 35 U.S.C. 154(b) by 920 days.

(21) Appl. No.: 15/885,354

(22) Filed: Jan. 31, 2018

(65) Prior Publication Data

US 2018/0233119 A1    Aug. 16, 2018

Related U.S. Application Data

(60) Provisional application No. 62/458,923, filed on Feb. 14, 2017.

(51) Int. Cl.

| | | |
|---|---|---|
| *G10H 1/36* | (2006.01) | |
| *G10H 1/00* | (2006.01) | |
| *H04L 29/06* | (2006.01) | |
| *G10H 1/34* | (2006.01) | |
| *H04L 29/08* | (2006.01) | |
| *G10H 7/00* | (2006.01) | |

(52) U.S. Cl.
CPC ......... *G10H 1/0008* (2013.01); *G10H 1/0058* (2013.01); *G10H 1/344* (2013.01); *G10H 7/004* (2013.01); *H04L 65/4069* (2013.01); *H04L 65/80* (2013.01); *H04L 67/06* (2013.01); *H04L 67/38* (2013.01); *G10H 2220/221* (2013.01); *G10H 2240/145* (2013.01); *G10H 2240/171* (2013.01); *G10H 2240/175* (2013.01); *G10H 2240/181* (2013.01); *G10H 2250/641* (2013.01); *H04L 67/42* (2013.01)

(58) Field of Classification Search
USPC .......................................................... 84/609
See application file for complete search history.

(56) References Cited

U.S. PATENT DOCUMENTS

| | | | |
|---|---|---|---|
| 5,918,213 A | 6/1999 | Bernard et al. | |
| 6,008,446 A | 12/1999 | Van buskirk et al. | |
| 6,643,744 B1 | 11/2003 | Cheng | |
| 6,700,049 B2 * | 3/2004 | Togashi | G10H 1/0058 84/609 |
| 7,276,655 B2 | 10/2007 | Lin et al. | |
| 7,655,855 B2 * | 2/2010 | Georges | G10H 1/0041 84/609 |
| 8,263,849 B2 | 9/2012 | Chamberlin et al. | |
| 8,653,349 B1 | 2/2014 | White et al. | |
| 2007/0071205 A1 | 3/2007 | Loudermilk et al. | |
| 2009/0241760 A1 | 10/2009 | Georges | |

* cited by examiner

*Primary Examiner* — Christopher Uhlir

(74) *Attorney, Agent, or Firm* — Kevin Schraven; Anooj Patel; Hankin Patent Law, APC

(57) ABSTRACT

A system and method for operating and performing a remotely networked virtual musical instrument. A client transmits musical control data to a remote server over the network, encompassing a digital music engine and digitally sampled virtual musical instruments. In return, the client consumes, synchronizes, and mixes the combined server playback stream from the network of the fully expressive and interactive musical performance with zero audible latency.

17 Claims, 7 Drawing Sheets

SYSTEM AND METHOD FOR A NETWORKED VIRTUAL MUSICAL INSTRUMENT

CROSS-REFERENCE TO RELATED APPLICATIONS

This U.S. Non-Provisional Patent Application claims the benefit of U.S. Provisional Patent Application No. 62/458,923, filed Feb. 14, 2017, entitled "A SYSTEM AND METHOD FOR A NETWORKED VIRTUAL INSTRUMENT", the contents of which are expressly incorporated herein by this reference as though set forth in their entirety.

FIELD OF THE DISCLOSURE

The present disclosure generally relates to a system and method for providing, operating, and performing on a remotely networked virtual musical instrument. In particular, the disclosure relates to virtual musical instruments and samplers, digital audio streaming, and overcoming network/Internet latency that causes problems in a variable performance using a virtual musical instrument. In addition, the system and method for a networked virtual musical instrument relates to e-commerce with respect to preview, purchase, security, performance and streaming of remote virtual musical instruments, digital audio and musical content.

BACKGROUND

The traditional digital music composition industry revolves around musicians owning a digital audio workstation (DAW) software on their computing device, such as a computer, laptop, tablet, smartphone, or other electronic data processing unit that downloads large virtual musical instrument libraries (samplers, synthesizers) and loads their content from disk, track by track, for composition and playback. Virtual musical instrument developers create sample libraries and musicians purchase and consume them as large, expensive collections of instruments or genres using conventional methods of manual purchase, manual download, disk storage, and/or loading through a subset of DAW technology, called a sampler or sample playback engine. This sampler or engine is responsible for audibly realizing the software virtual musical instrument sound. The sampler is the cornerstone of the experience. It is the format by which the developers author their products and the tool by which the musician composes and plays the virtual musical instruments.

Virtual musical instruments plug into the DAW software along two primary formats: AU (audio units, which is Apple® based) and VST (virtual studio technology, which is Apple® or PC compatible). Once a musician has purchased the entire library, they download and own the licensed files that are part of the library. The musician must take care not to lose them or request a manual re-download and re-authorization. Musicians usually buy the library as a bulk collection of virtual musical instruments on a particular sampler platform that suppresses the separation or individual purchase of the instruments or patches. Most virtual musical instrument sample libraries are in the range of 10-100 GBs and may cost hundreds or even thousands of dollars each. It generally takes over 6 months from idea to release for developers to produce a sample library. The producers then sell them as a boxed or downloadable item from a vending website. There is no uniform method for hosting, instantly previewing, purchasing, and using the libraries without significant expense, time, bandwidth, and/or processing power, Additionally, despite being organized around relatively consistent sampler library formats and protocols, there is no uniform way to mix, match, play, preview, compare, and/or assemble virtual musical instruments from multiple providers into one platform, plugin, or stream unless fully purchased and physically downloaded en masse.

In contrast, the average mobile user has a completely different experience with how their digital content and music are consumed or enjoyed. Users can search the web, mobile, social media or bespoke media platform for any music, artist, genre or they like. They can instantly and securely buy just one or many songs from a single tap and immediately enjoy them as a download or a stream on almost any device with low to zero latency. Once they purchase or stream, they get eternal access to the content but do not usually have to maintain a physical copy. They can preview the song in various formats before deciding to purchase. In addition, musicians can just as easily create, produce and distribute new songs for users to buy, stream and enjoy in a well-oiled marketplace that reduces the time to market and streamlines both the ability to create and consume as well as commercialize and pay for the content created.

Similar restrictions exist for digital music or soundtracks that accompany games, software, mobile or virtual reality (VR) experiences. Traditionally, bulky or pre-made music files are downloaded or installed locally with the game or experience device and played on demand, layered or mixed, as a facet of the program or playback. Alternatively, low-quality, canned remote music is streamed as a pre-mixed source such as an audio feed or streaming audio to accompany video, game, apps, VR or broadcast. In either situation, generative interactivity is usually sacrificed for timeliness, quality or storage.

What is lacking is a hybrid approach whereby locally designated control or composition data is transmitted to a larger, more powerful cloud-based music engine to remotely construct and playback the music dynamically, then return a single, audio stream that requires little processing or bandwidth to consume. The net benefit would be a bespoke real-time composition based on virtually unlimited remote resources and streamed in real-time to the calling/composing device or program with no latency or restrictions on time, capacity, complexity or quality. Before the present disclosure, the industry was forced to deal with remotely streamed canned audio or the bulk of locally stored or downloaded audio files.

The goal is to combine the world of networked mobile digital music consumptions with the technology of digital music compositions, virtual musical instruments, samplers and synthesizers with the modern way content is created, composed, consumed, and commerced in the cloud. An ideal configuration may be a remote, cloud-based server hosting digital sampled musical instruments and audio files, which may be accessed across a network by electronic computing devices and related input devices and software programs. The composer, player/user, or program interacts to perform the musical instrument or composition remotely, and the system may then return a mixed audio stream of composition across the network to the local device for playback or recording in real-time. A person, device, or program may send control data across the cloud to a server, where the server (1) responds, processes, and/or mixes the musical instrument sound(s), and (2) sends back a single, combined stream to that local device where it is realized as audible playback with no latency.

The remote performance and composition may be of any complexity without requiring additional local processing or bandwidth utilization beyond a single note stream. This allows for an expansive local musical experience, unlimited remote storage of digital instrument sound data, and theoretically unlimited remote processing power, polyphony and digital effects. The preferred system enables users, devices, and programs with low-power processing, small-storage and low-bandwidth connections to play or compose rich, high-quality music across the network in real-time for local recording, performance, or enjoyment.

Unlike solutions that are not the current disclosure, which attempt to provide a complete cloud-based DAW (digital audio workstation) such as Splice®, Ohm Studio®, Bandlab®, and others, by running 100% of the remote music creation experience in the cloud with local inputs and monitoring, the solution needed is an interactive, networked virtual musical instrument system that can offer real-time local composition with scalable remote realization, yet with local zero-latency playback and no limitations in expression, complexity or polyphony. This solution would offload the traditionally heaving lifting to digital media processing to the remote scalable servers and deliver tactile control and immediate playback to the local system for enjoyment, interaction with a host application or experience. It would be in essence, music as a service (MaaS) or a true application programming instrument (a different kind of API).

One challenge is to allow for low-bandwidth and low-powered devices to perform complex musical performances and compositions using high-quality sampled digital musical instruments without significant resources or network capacity. Digital audio workstations (DAW) usually require significant CPU power, memory (RAM), large, fast disk storage (SSD or 7200 RPM drives). The rise in popularity of mobile devices such as tablets and smartphones with better chips and flash storage inch closer to being truly remote music and audio creation devices, but fall far short of the storage capacity required to create professional quality productions or content. In addition, these devices are remotely, and typically wirelessly, connected over the Internet via various cellular networks such as 4G and LTE, thus requiring a conservative approach to bandwidth capacity and usage. Mobile devices cannot store multiple gigabytes of musical instrument sample files and do not possess the processing power to manage multiple streams of concurrent audio polyphony.

another challenge of such a system may be to have functionality over a vast electronic network (as opposed to within a closed system/backplane or expensive, high-bandwidth local network tuned to that specific data transfer purpose) and overcome the natural, physical latency introduced by such electronically networked devices. Music and sound, unlike print or images, are synchronous, time-based concepts for which the human ear expects real-time performance and playback. Also, unlike video or pre-recorded music which can buffer and maintain a look-ahead gap to achieve streaming consistency in arrears during playback over a network, musical instruments are performed interactively in real time. The pressing of a key or strumming of a guitar string followed by 100 ms of latency before the corresponding note audio or sound is heard would be unacceptable to a performer or listener, whereas the pressing of a play button to start a video with a 1-2 second pause to maintain the buffer, is entirely permissible.

A third challenge may be overcoming network latency. Internet network latency is a variable value and fluctuates between individually sent packets. The lack of predictability and precision in this area is the primary problem that fells the majority of the current systems in this space. With fixed buffers, pre-fetched approximating algorithms and closed-system solutions found in current systems, existing systems fail to precisely overcome this obstacle, or simply perform real-time playback of digital music sampler data by using cache and memory storage or data tables within a single computer, backplane, cache or local network. The variable latency of the Internet and intermediary equipment (routers, hubs, firewalls, devices) can add upwards of 500 ms or more of latency per single round-trip packet. When a key is pressed, it may take 300 ms to hear the first note, but only 120 ms the next one. Being too fast or too slow are equally problematic. The disjointed reality of the internet platforms makes for an unmusical and unplayable real-time experience and thus has yet to be overcome, until this present disclosure.

A fourth challenge is realism. When performing a real, analog, musical instrument, there are aspects to playability that are mimicked in virtual musical instruments, such as but not limited to, starting notes (attacks), ending notes (decays), cross-fading (across volume or timbre changes), and legato (smooth transitions between notes). Also, playing polyphonically (many notes at once) requires dynamic layering and blending of notes at different times in their lifecycle, which is impossible to reproduce without actually mixing the notes down to a stereo or combined stream. Timing is critical to ensure alignment. All of these realistic digital sampler techniques rely upon real-time processing to achieve a simulation of an actual organic performance. The musical instrument sample (or library) itself is made up of thousands of individual sample files or slices which must be triggered and/or blended in real-time to achieve these effects. The introduction of random network latency makes consistent playback and orchestration of all these samples challenging and adds a layer of extreme difficulty to the delivery of such musical expression and performance. No system before the system of the present disclosure has succeed in this.

A fifth challenge is one of format and interface. Historically, much like MP3 or WAV file formats for music listening, digital musical instrument libraries and files fall into a few popular platform-specific plugins such as Audio Unit (Mac) or VST-Virtual Studio Technology (Mac/PC). In addition, developers use proprietary instrument library formats such as Kontakt™, Gigastudio™, SoundFont™ and others which have built-in security, copy-protection or DRM (digital rights management) and monolithic, bespoke data structures and databases. These choices severely limit the human and programmatic options to interact with, engage, and consume digital musical instrument data on devices as common as the mobile phone, tablet and/or connected wearable. The challenge is to overcome these restrictions with a more open format that is both developer and device application program interface/instrument friendly, offering up the ability to remotely compose and consume dynamic, real-time music and audio over any language, protocol, or interface, even those that are low power and bandwidth.

In addition to outgoing formats, the most common incoming musical control data is also a legacy protocol known as MIDI (musical instrument digital interface) which has historically been the method by which devices talk to musical instruments or engines to control playback, composition and performance. MIDI is a serial technology invented during the era of strictly cabled connections. While modern methods wrap MIDI over more network-friendly protocols such as USB, THUNDERBOLT, TCP-IP, WIFI and Bluetooth®, the abandonment of this legacy language in favor of more modern, open programming languages is also desired and this presents a challenge to an open, networked approach.

Another challenge is to apply secure, e-commerce functions to allow composers, players, and programs to trial, sample, test, purchase, subscribe, secure, consume, download or stream and interact with the dynamic digital music instrument content from any device or network. Digital music instruments and sounds have been traditionally bought, sold, and secured like their physical counterparts with little innovation towards an on-demand ability to select, compare, demo, trial and purchase a single or few instruments or patches as opposed to downloading, demoing and purchasing them in bulk. This legacy approach required expensive financial and computational or storage overhead to engage from a consumer's perspective and has thus, restrained the growth of the industry in comparison to other digital media markets. There has been no scalable, Netflix®-style service for virtual musical instruments, until the system of the present disclosure.

Thus, based on the foregoing, what is needed is a unique solution to meet and exceed the challenges set above in service of a truly dynamic remote digital musical instrument system capable of both human and programmatic real-time performance and composition over the network.

SUMMARY

To minimize the limitations in the cited references, and to minimize other limitations that will become apparent upon reading and understanding the present specification, the present specification discloses a new and improved virtual musical instrument device, method, and system.

The system and method for a networked virtual musical instrument may be designed to offer an innovative, applicable and practical way for musicians, devices, and programs to interactively perform musical control data against a remote virtual musical instrument or sampler server and consume the complex audio result as a single programmatic stream in real-time with zero latency. Additionally, the system and method for a networked virtual musical instrument offers an innovative, flexible, and interactive method to preview, purchase, subscribe, secure, download, stream or consume interactively and dynamically performed musical content and the underlying virtual musical instrument content from low-powered, low storage or low-bandwidth devices via a modern e-commerce model.

Preferably, the present system and method for a networked virtual musical instrument t provides real-time interactive virtual music instrument performance between a client (user and user's device) and a remote server over the Internet or other network with zero audible latency from the corresponding client musical control event.

One embodiment may provide a networked virtual musical instrument that provides a client and server separated by a network a way to negotiate the latency between them as measured by the time taken to send a standard packet of data between them. The system may provide a calculation of that latency as a value greater than the latency itself to append to all communication and transmission between client and server, to define the latency offset window value. The system may also provide a periodic re-evaluation of that latency and recalculation of the latency offset window value in real-time, as the actual latency between client and server over the network fluctuates.

One embodiment of the present system and method for a networked virtual musical instrument may provide a protocol for the client to communicate with the remote server and select one or more remote digital sampled instruments, in order to provide a current latency offset window value.

In one embodiment of the present system and method for a networked virtual musical instrument, the server may be allowed to load the desired digital sampler musical instruments and, based on the offset window calculation, segment partial offset start samples or slices ("heads") required for the local client to cover the offset gap, and transmit the heads back to the local client.

In one embodiment of the present system and method for a networked virtual musical instrument, the server may be allowed to return the desired musical instrument offset window end samples to the client in batch, or in part, as control data is sent, and warrants additional samples to complete the entire range of required partial samples or slices ("tails").

The present system and method for a networked virtual musical instrument may allow the client to receive the start sample slices (heads) from the remote sampler server and locally load, organize, and prepare the heads in memory for synchronized local audio playback or processing in response to local control data.

The present system and method for a networked virtual musical instrument may provide a server that may have a buffer, which may load resultant tail samples, as measured by current offset remainder values or layers, and a network socket to mix and stream those resultant samples, in response to transmitted local client control data, to the client in real time.

The present system and method for a networked virtual musical instrument may be configured to allow the client to construct the first of four buffers: one for queuing and sending control data over the network to the server.

The system may allow the client to construct a second buffer for loading and playing locally the retrieved start, end, or partial sample slices in service of covering the offset window gap.

The present system and method for a networked virtual musical instrument may allow the client to construct a third buffer for receiving and throttling the incoming server tail sample streams, and a fourth for throttling, mixing, queuing, synchronization, and output.

In one embodiment, the present system and method for a networked virtual musical instrument may allow the client to utilize the three buffers to compensate for the latency offset window and the actual experienced network latency, thus ensuring zero-latency when mixing local start/end samples with the incoming resultant samples slices stream from the remote sampler server to produce seamless polyphonic audible events from each corresponding control data event.

The present system and method for a networked virtual musical instrument may allow the client to transmit musical control data, console event timestamp data, and the currently calculated latency offset value to a remote server over a network.

The present system and method for a networked virtual musical instrument may allow the client/system to locally stream and begin playback of local offset audio sample slices with control data timestamp, up to the point of the window offset calculation.

The present system and method for a networked virtual musical instrument may be configured to allow the server to accept the incoming client control data, timestamps, and latency offset values.

The present system and method for a networked virtual musical instrument may be configured to allow the server to load, process, playback, mix, and stream the desired musical instrument resultant offset samples as designated by the offset window in response to the control data parameters, appending original control event timestamp to the mix.

In one embodiment, the present system and method for a networked virtual musical instrument may be configured to allow the server to buffer and stream the resultant mix of remotely performed resultant offset samples as a single stereo or multichannel data/metadata stream, along with original timestamp metadata, back to the local client, across the network.

The present system and method for a networked virtual musical instrument may provide the local client (user and user's device) an incoming socket buffer to receive the resulting remote server mixed audio stream and timestamp metadata.

The present system and method for a networked virtual musical instrument may allow the client to buffer and synchronize and mix, by offset window and timestamp, the start points of the server audio stream with the end points of the locally played offset server stream (like a zipper) to produce a final, seamless and zero-audible-latency output from the initial control data event.

The present system and method for a networked virtual musical instrument may allow the client or user device to buffer, stream, playback, or process the resultant zero-latency mix in real-time, as desired, to the device audio output.

The present system and method for a networked virtual musical instrument may provide for both the client and the remote server to polyphonically conduct the previous steps interactively for single, concurrent, sequential or delayed musical performances or compositions via these methods for seamless, zero-latency playback or processing on the local device of both local and remotely processed control event data and resultant audio data stream.

The present system and method for a networked virtual musical instrument may provide the client the ability to preview, purchase, and subscribe to some or all of the functions, sampler content, or resultant data as detailed in the aforementioned objects and methods.

The present system and method for a networked virtual musical instrument may provide the remote sampler server the ability to secure, protect, encrypt, constrain, and enforce access to the digital sampler instrument and audio stream content as detailed herein.

The present system and method for a networked virtual musical instrument may provide the local client the ability to download an entire digital music instrument sample content or library of digitally sampled instruments for complete client control, streaming and audible playback without further communication with the remote server sampler or traversing of the network.

The present system and method for a networked virtual musical instrument may seamlessly circumvent all resultant audible latency, as introduced by the network or processing, from the initial musical control data event to resultant local audio playback or stream.

The present system and method for a networked virtual musical instrument may provide the aforementioned objects and methods as available for engagement by human users via local control data created through devices such as MIDI keyboards, digital musical instruments (guitar, drums, bass, keyboards, and the like), qwerty keyboards, expressive gestures or stimulus, mobile devices, wearables, optical or audible sensors, textual or numeric data, metadata or other inputs.

The present system and method for a networked virtual musical instrument may be configured to be engaged by programs via an open API (application program interfaces), such as gaming platforms, websites, web services, apps, mobile devices, virtual reality platforms, artificial intelligence (AI) programs, other local or networked platforms, devices or applications, wearables, smart devices, vehicles, structures, wired or wireless networks, protocols or other programs, code, data or metadata.

It is an object of the present system and method for a networked virtual musical instrument to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION

Terms and Definitions

Figure 1:
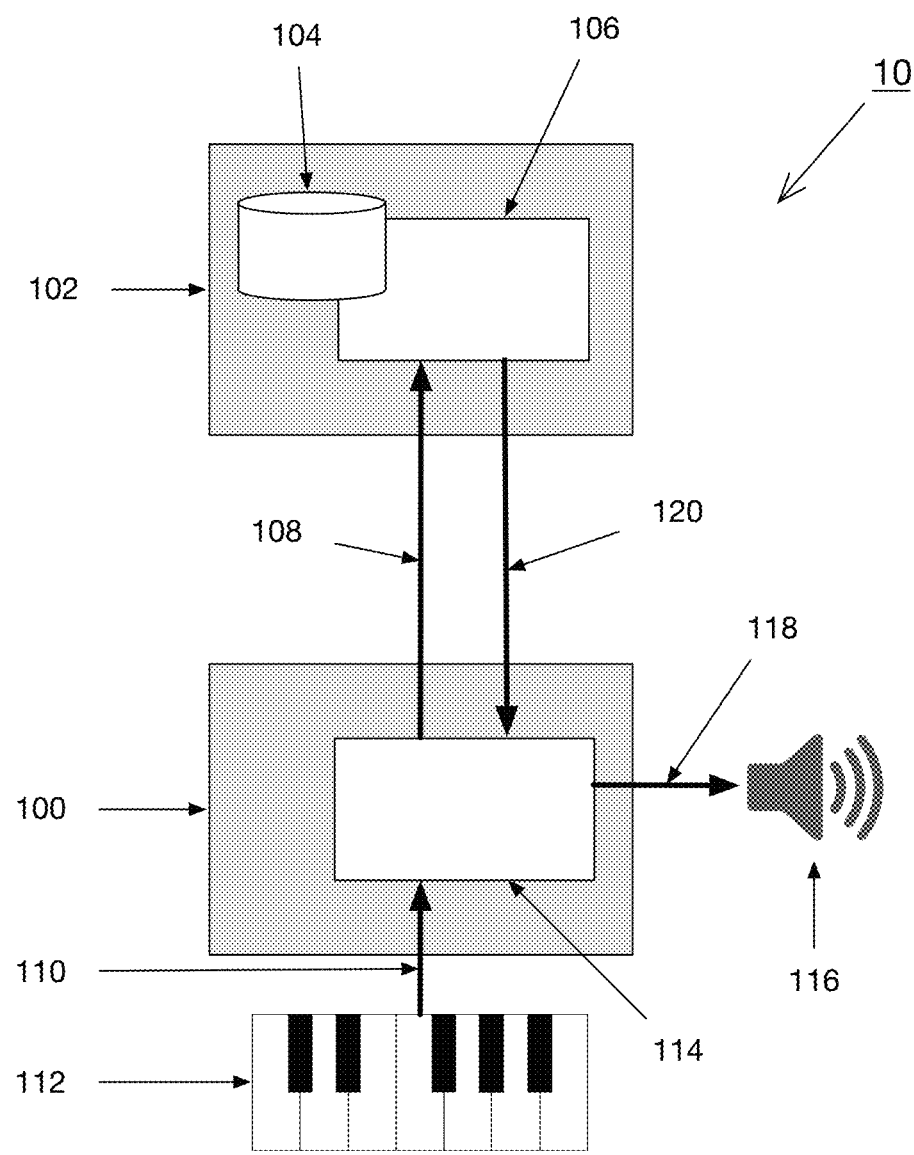
FIG. 1 is a diagram of one embodiment of virtual musical instrument system and shows an overview of the system with a networked local client, remote server, musical control input device, and an audio output device.

In the following detailed description of various embodiments of the system, numerous specific details are set forth in order to provide a thorough understanding of various aspects of one or more embodiments of the system. However, one or more embodiments of the system and method for a networked virtual musical instrument may be practiced without some or all of these specific details. In other instances, well-known methods, procedures, and/or components have not been described in detail so as not to unnecessarily obscure aspects of embodiments of the present disclosure.

While multiple embodiments are disclosed, still other embodiments of the present disclosure will become apparent to those skilled in the art from the following detailed description, which shows and describes illustrative embodiments of the present disclosure. As will be realized, the system and method for a networked virtual musical instrument is capable of modifications in various obvious aspects, all without departing from the spirit and scope of the present disclosure. Accordingly, the graphs, figures, and the detailed descriptions thereof, are to be regarded as illustrative in nature and not restrictive. Also, the reference or non-reference to a particular embodiment of the present system and method for a networked virtual musical instrument shall not be interpreted to limit the scope of this disclosure.

In the following description, certain terminology is used to describe certain features of one or more embodiments of the system and method for a networked virtual musical instrument. For instance, the terms "device", "computer", "electronic data processing unit", "system server", or "server" refers to any device that processes information with an integrated circuit chip, including without limitation, personal computers, mainframe computers, workstations, servers, desktop computers, portable computers, laptop computers, embedded computers, wireless devices including cellular phones, personal digital assistants, tablets, tablet computers, smart phones, portable game players, wearables, smart devices and hand-held computers. The term "internet" refers to any collection of networks that utilizes standard protocols, whether Ethernet, Token ring, Wi-Fi, asynchronous transfer mode (ATM), Fiber Distributed Data Interface (FDDI), code division multiple access (CDMA), global systems for mobile communications (GSM), long term evolution (LTE), or any combination thereof. The term "website" refers to any document written in a mark-up language including, but not limited to, hypertext mark-up language (HTML) or virtual reality modeling language (VRML), dynamic HTML, extended mark-up language (XML), wireless markup language (WML), or any other computer languages related thereto, as well as to any collection of such documents reachable through one specific Internet Protocol Address or at one specific World Wide Web site, or any document obtainable through any particular Uniform Resource Locator (URL). Furthermore, the terms "webpage," "page," "website," or "site" refers to any of the various documents and resources on the World Wide Web, in HTML/XHTML format with hypertext links to enable navigation from one page or section to another, or similar such resources used on the Internet.

The term "buffer," "queue" or "audio buffer" is ideally a software program used to implement a fixed or dynamic input/output, read/write construct for maintaining constant flow of audio signals and synchronized playback amidst varying degrees of latency or processing.

The term "audio stream" is ideally a stream of stereo audio frames composed of and read and mixed from various original instrument sample files (WAV, AIFF, etc.) that is read or written for transmission from server to client over a network.

The term "chunk" refers to the size of audio samples in a frame taken from a single sampler audio file, mix or stream. Chunks determine the percentage of sample taken in a single pass of the application or buffer. Smaller chunks require more processing or cycles. Larger groups of frames (chunks) require less processing but have less precision.

The term "client" or "client application" is ideally the local electronic computing device, standalone application or API that composes and transmits control data to the server and receives server output streams, processes sockets, local audio sample files and synchronizes audio streams and timestamps for local audible playback. The client "sends" the notes remotely, "hears" the incoming audio.

The term "clock" or "sync" is ideally a threaded timestamp/frame software mechanism to synchronize audio samples and control data between client and server streams, offset client and server streams for the purposes of compensating for dynamic latency.

The term "compensation" is ideally the buffer frame offsets designed to compensate for latency, start samples or buffer over/under runs in service of a consistent, real-time audio experience for the user/player.

The term "control data" is ideally a generic term for streamed or generated musical note or expression data, MIDI event data or programmatic data that controls the playback and timing of audio instrument samples, either locally or remotely.

The term "frame" is ideally one slice of an audio sample chunk, according to chunk size (samples per chunk) that is stored, appended or popped from the audio or MIDI buffer.

The term "head(s)", "initial offset window" or "starts" refers to the sample data for each corresponding note sample from the initial sample slice (0) up to the size of the latency offset window value. The "starts" are segmented on the server and batched and sent to the client for offset playback to cover the latency. If there are 44,100 samples per second in a normal 16-bit/44.1K sample, and the offset window is 50 milliseconds, the start sample would be the first 2,205 samples out of the entire sample file. The balance (remainder) would be the "tail" sample, of 2,206 on to the end and remain for playback/mixing in the cloud on the server.

The term "instrument," "virtual instrument", "virtual musical instrument", or "sample library", is ideally a logical collection of digital samples for a particular musical instrument sound family or patch, like brass, strings, piano, or percussion, but could also be any logical grouping of sampled sounds. Libraries or groups of instruments are selected by clients utilizing the system and method for a networked virtual musical instrument service and optionally purchased or subscribed to via e-commerce options.

The term "latency" is ideally the delay between when synchronous events correlate, introduced by algorithmic, physical or network based delay of buffers, sockets, streams and processing. Latency is the sum total of all end-to-end latent functions or effects, measured in human time between issuing a control message and hearing the resultant audio or sound.

The term "MIDI" is "musical instrument digital interface" is ideally a data protocol for capturing, sending and processing control/event data from a program or keyboard that maps to standard musical functionality.

The term "mix" is ideally the act of continually merging and summing the "played" (read) polyphonic sample data into a single sound to simulate playing the instrument in real time. Mixing involves summing the samples per frame, dividing by the number of samples and appending the new mixed frame to the ensuing buffer.

The term "offset" is ideally the range of frames for start samples that must be locally pulled and triggered to cover the latency introduced by processing and the internet. Server samples triggered by the control data stream with the start offset adjusted so that the resultant mixed streams may be synchronized.

The term "plugin" is ideally a software application wrapper meant house and provide an interface between a digitally sampled instrument or synthesizer code and the hosting DAW (digital audio workstation) or recording software application, usually found on a networked desktop, laptop, tablet or mobile device.

The term "polyphony" is ideally the musical concept of multiple notes played at the same time, or the maximum concurrent sample playback threads at a given time, constrained by thread management.

The term "sampler" is ideally the general engine that handles instrument sampler digital audio file initialization, playback, thread management and audio output, in response to control or MIDI data input and instrument selection or configuration.

The terms "sample" or "slice" ideally refer to two definitions: first, an individual audio file that represents a full or partial note, technique or tone in a musical scale for a digitally sampled instrument, referenced by a unique identity number. Samples are mixed with other samples to create mixed or layered music. The second definition is an individual slice of audio data within an audio sample chunk, represented by a digital value based on its depth (abs value) and resolution (slices per second).

The term "server" or "server application" is also ideally the cloud/networked electronic computing device, standalone application or API component that receives control data and performs remote sampler or virtual musical instrument functions on behalf of the client such as instrument selection, sample loading, offset calculation, sample "playback," mixing, and audio streaming back to the client.

The term "socket" is ideally a network communication port between client and server over which header, binary or string data can be transmitted streamed as a sequence of bytes or frames.

The term "tail(s)", "resultant offset window" or "ends" refers to the sample data for each corresponding note sample from the corresponding offset window value sample slice (N) up to the size of the full sample file. The "tails" are segmented on the server and stored for playback and mixing on the server in response to transmitted client control data. The "tails" are "fast forwarded" to a future point in time, so their natural mix will dovetail with the starts when synchronized on the client, based on the offset. If there are 44,100 samples per second in a normal 16-bit/44.1K sample, and the offset window is 50 milliseconds, the tail sample would start after the first 2,205, or sample 2,206 and go to the end of the entire sample file.

The term "throttle" is ideally a coordinated technique of the client and server buffers and the queues that is designed to maintain consistent dovetailing of samples, streams, and timestamps within the latency offset window. Throttling ensures that, though an actual, physical network or programmatic latency fluctuates, the consistent resultant audible, musical, and rhythmic stream of the interactive performance remains intact. If the latency exceeds the offset window capacity, throttling is responsible or advancing the buffer/queue to retain primarily rhythmic consistency, followed by musical or audible consistency.

The term "timestamp" is ideally a data construct that stamps sample data or metadata with local system time or sequence at certain points of execution, utilized for logging, synchronization or thread management.

The term "virtual musical instrument" may refer to the software and hardware system that may comprise, audio samples, scripts, data and other instructions to emulate a physical or real musical instrument counterpart, such as a piano, guitar or horn, when played. Samplers create and playback virtual musical instruments within a DAW programs or plugin. The DAW loads sampler plugins to load, host and connect incoming musical instructions (MIDI data, etc.) with the virtual musical instrument content resulting in an audible musical simulation of the actual instrument sound and performance.

In the following description, certain terminology is used to describe certain features of one or more embodiments. For purposes of the specification, unless otherwise specified, the term "substantially" refers to the complete or nearly complete extent or degree of an action, characteristic, property, state, structure, item, group of items, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, group of items, or result. In another example, substantially all of a group of items, may include all of the items of that group, or at least all of the items of that group that re generally within the normal parameters for the items. To the extent that the group of items might include members that far exceed the normal parameters, this abnormal item might not be expected to be part of substantially all the group of items.

As used herein, the terms "approximately" and "about" generally refer to a deviance of within 5% of the indicated number or range of numbers. In one embodiment, the term "approximately" and "about", may refer to a deviance of between 0.0001-10% from the indicated number or range of numbers.

Networked Virtual Musical Instrument

The primary function of the present system and method for a networked virtual musical instrument is to provide a real-time interactive virtual music instrument performance between a client and a server over the Internet or other network, with the bulk of the scalable instrument storage and processing performed on the server while the musician performance (input) and resultant audio output of the virtual musical instrument are both accomplished on a lower powered client without audible latency. As stated, networked virtual musical instruments, other than the system of the present disclosure, suffer the natural latency as an audible gap between the time when a musician or program authors or transmits a musical control event (example, MIDI, i.e. press a key on controller keyboard, strike drum pad or playback MIDI data from a sequencer) and the time the corresponding audio can be heard from the local client output device. Other non-interactive media, such as songs, movies, and web media simply buffer their content by a coarse, arbitrary amount to get slightly ahead of the latency and then stream it in arrears for a simulated unbroken, and continuous broadcast to the client. However, musical instruments and, more specifically, sampled virtual music instruments, are an interactive, time-based medium where gaps in the control event to audio realization lifecycle are unmusical and restrict the ability to actually "play" the instrument with aesthetic satisfaction and rhythmic integrity. The situation is compounded when adding in complex polyphony and expressive techniques.

Traditional virtual musical instruments reside locally on a system with low-latency optimization such as an internal computer, tablet or bespoke device (synthesizer, sampler, drum machine) or on a fully tuned and optimized network of high-throughput, low-latency networking protocols, synchronization clocks and cabling with fixed latency and predictable algorithms. Networked virtual musical instruments played over the Internet between clients and servers are plagued by typically unsurmountable challenges such as increased or dynamic network latency, packet loss, shallow or low-priority bandwidth and limitation of processing or storage resource on the client end. Sampler instruments are more challenging than traditional synthesizers. Synthesizers process little to no sample data (small file sizes) but still have real-time round-trip latency to combat. Sampled virtual musical instruments often entail multiple gigabytes of sample data, something that is not easily and surely not rapidly downloaded or streamed across the Internet to lower-powered devices over consumer-grade network bandwidth. A 10 GB virtual musical instrument would take minutes if not hours to download. Currently, it is not possible to stream that large of sampled instrument, note by note, if the entire sample set for each event or technique had to be streamed with every key press of a piano sonata or hit of a rapid drum solo. At best, there are milliseconds to full seconds of latency. At worst, the entire sample set would have to be downloaded before a single note could be played. The anticipated benefits of the potentially limitless server scalability of the present system is to handle processing and storage intensive virtual musical instruments on behalf of hosts of concurrent clients are mitigated by these non-musical challenges of size, bandwidth, latency, interactivity, and synchronization.

The present system and method for a networked virtual musical instrument presents a novel system and method to overcome all of the challenges and provide a remotely hosted virtual musical instrument that can be accessed, performed, and audibly realized by numerous local clients in real-time with zero audible latency. The system and method for a networked virtual musical instrument prevents the historical need to download the entire instrument sample data (multiple gigabytes) to the client as well as avoids any audible gaps from key or control event to corresponding playback, even in expressive, polyphonic, and low bandwidth/storage/processing scenarios.

The system and method for a networked virtual musical instrument is based on a dynamic buffer system that can negotiate real-time latency and pre-fetch only minimal start sample data to cover the widest anticipated latency and then play those starts locally in real-time. The start samples play long enough per note to audibly cover more than the round trip of remote processing, mixing and down streaming of the balance of the instrument sample audio back to the client. The client queues the balance of the audio stream which arrives before the latency window closes, and buffers/mixes that stream with the tail of the start samples, resulting in a consistently real-time performance of the audio notes as played, regardless of actually latency.

If the actual latency is shorter than the window, the system and method for a networked virtual musical instrument simply buffers the incoming server stream at the client until the timestamp of the end of the client start notes warrants the beginning of the note balances sent as a mixed stream from the server. If the latency is longer than the window, to maintain musicality, the buffer throws away queued audio to "catch up" to maintain musical rhythmic integrity. This is the core of the system and method for a networked virtual musical instrument: a triple buffer designed to measure current latency, buffer outgoing and incoming start (small/minority) and end (majority) sample audio streams as played by corresponding control events (notes), and synchronize when latency is either too short or too long to maintain consistent rhythmic and audible musicality, i.e. what the performer expects to hear.

Others have consistently failed to negotiate the dynamic nature of network latency, only attempting to buffer against anticipated gaps as a fixed value. If the latency fell outside the window, notes would accumulate in arrears and play back significantly delayed—the worst of all musical results. If the latency were to shorten over time, current systems have also been unable to compensate for that opposite direction, because sample audio arrives early, colliding with current notes that are finishing, which results in crackles, pops, artifacts, and sample distortion. Other systems simply tend to approximate a fixed latency (often based on user selection) and merely hope for the best in matching local note event data to remotely streamed audio. The rhythmic and audible consistency of a networked virtual musical instrument is not the same as a fixed, streaming video (or audio), which simply tries to stay ahead of the latency and the buffer. This standard online streaming method works for non-interactive content, but fails when interactivity is part of the equation. With musical performances, the next note or technique cannot precisely be anticipated and the combination of notes and techniques creates new, wonderful, and unanticipated audible result. However, the realization of those audible musical events comes with immediate aural expectations and musicians will not accept unintended, intermittent, or fluctuating increases or decreases in latency.

Unlike other systems, the present system and method for a networked virtual musical instrument does not leave the complex latency compensation to a rough approximation of a fixed, user-selected or one-time measured value, but rather it dynamically interrogates and negotiates the actual latency offset window in real-time, note by note, synchronizing the zero-gap playback of interactive, polyphonic local and remote streams. If latency exceeds beyond the algorithmic window, audio may be inevitably dropped, but rhythmic integrity will be maintained. This represents a true innovation in the field and the fulfillment of the wishes of many Internet-based musicians and network virtual musical instrument developers.

FIG. 1 is a diagram of one embodiment of virtual musical instrument system and shows an overview of the system with a networked local client, remote server, musical control input device, and an audio output device. As shown in FIG. 1, the present system and method for a networked virtual musical instrument 10 may comprise or interact with a local client 100 and server 102 separated by a network to negotiate the latency between them as measured by the time taken to send a standard packet of data between them via connections 110, 108. Preferably, the server 102 comprises or hosts a database 104, which may have one or more virtual musical instrument programs, sample data, and metadata. FIG. 1 shows that the system may also comprise incoming and outgoing network buffers 108, 120, a sampler engine 106, and an API, to communicate with the client(s) 100.

In one embodiment, the client 100 is a DAW plugin on an electronic computing device that contains a local sampler application 114, a musical control event input device 112 or programmatic facility. The input device 112 may be, for example, a MIDI keyboard, digital musical instruments, qwerty keyboards, expressive gestures or stimulus, virtual reality input devices, mobile devices, wearables, optical or audible sensors, textual or numeric data, metadata, or other inputs of the like. Preferably, the system may also comprise, a local playback engine 116 (also called a local audio device) with external audio device support, such as speakers and the like, four buffers for communication and synchronization with the outgoing control data 108, local start sample playback data and timestamps, remote incoming audio streams 120 and final, mixed output stream 118 to the local audio device 116, and a user interface, such as a display and keyboard or a touch screen, for instrument selection and system processing visualization.

Figure 2:
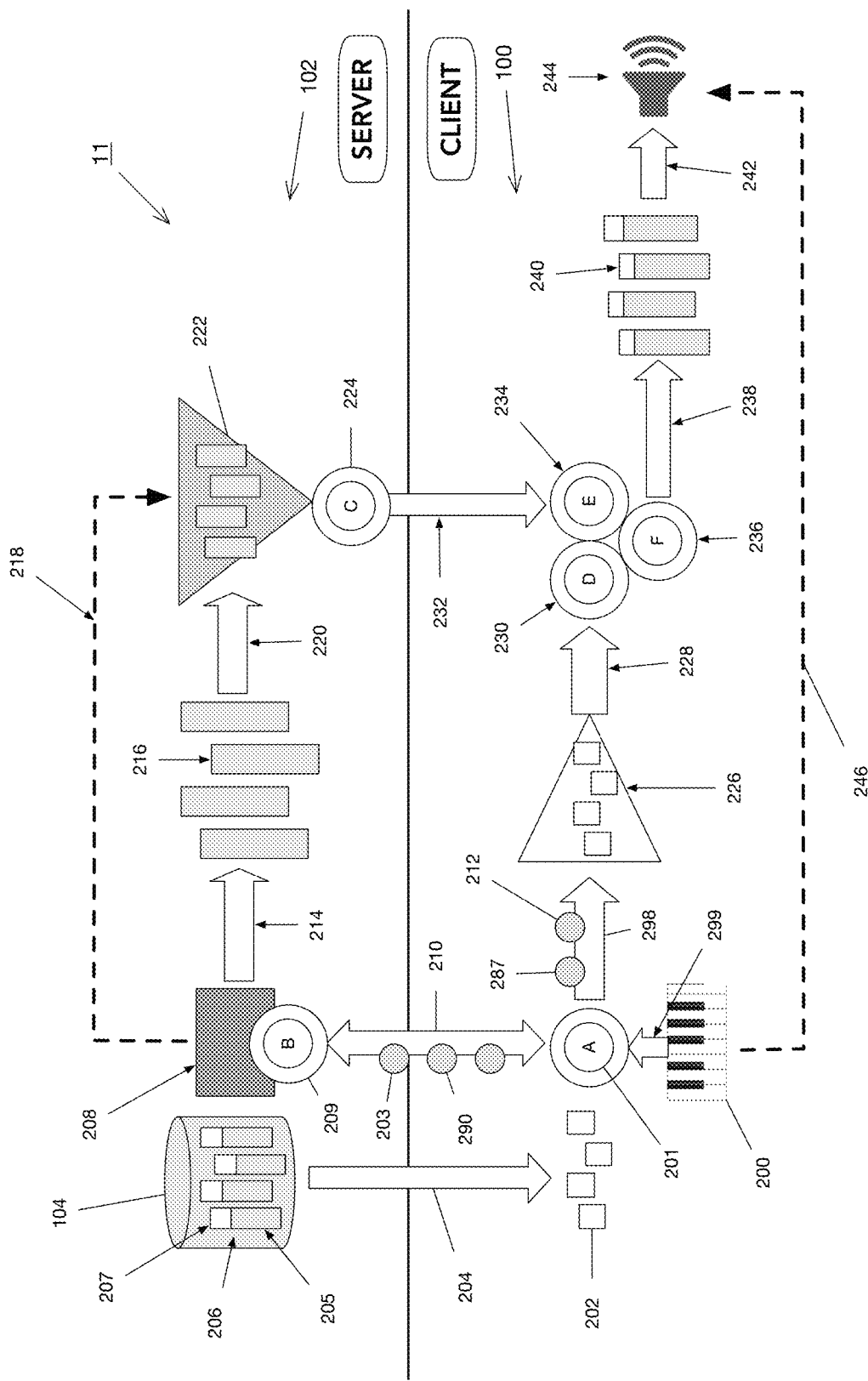
FIG. 2 is a diagram of one embodiment of virtual musical instrument system and shows the detail components of the client application and control data, server application and instruments, communication, transmission flow, synchronization and all inputs, buffers and outputs in context.

FIG. 2 is a diagram of one embodiment of virtual musical instrument system and shows the detail components of the client application and control data, server application and instruments, communication, transmission flow, synchronization and all inputs, buffers and outputs in context. In one embodiment, the present system and method for a networked virtual musical instrument 10, 11 may perform a periodic and continual re-evaluation of that latency and recalculation of the current latency offset window value 308, in real-time, as the actual latency between client and server over the network fluctuates. Changes in the offset window value 308 may affect the buffer synchronization of both the client and server buffers 201, 209, 224, 230, 234, 236, but do not or cannot re-affect the original outer offset window start sample size 202, unless manually re-segmented and re-transmitted from server 102 to the client 100.

In one embodiment, the present system and method for a networked virtual musical instrument may provide a protocol and an interface for the client 100 to communicate with the remote server 102 and select one or more remotely served digital sampled musical instruments 206 from a database 104, providing the current latency offset window value 308. Preferably, the client 100 may re-select new remote server virtual musical instruments, from time to time, from the database 100.

Preferably, the present system and method for a networked virtual musical instrument may allow the server 102 to load the client-requested virtual musical instrument samples 206 from the database 104 and based on the offset window calculation, segments partial offset start samples or slices 207 required for the local client 100 to cover the offset gap, and transmit them back to the local client in bulk via the network 204. An API may perform the transmitting. Care may be taken to only segment the minimum required sample sizes to cover the latency window plus algorithmic processing time to ensure smooth windowing of the sample performance conducted in tandem by both the client 100 and server 102. The offset start samples 207 may be a fraction of the full virtual musical instrument sample size and only need to be transmitted once per musical instrument selection and initialization. The offset start samples 207 may come in batch or streamed individually based on efficient note mapping until all start samples have been transmitted from client 100 to server 102, where they become offset window start samples 202.

For example, for a standard piano virtual musical instrument of 10 GB (which may be about 88 notes), the start sample slices may be 8 kb each per note, or roughly 1 MB total in size (or 2 MB for stereo) transmitted from server to client at initialization. The balance of the 9.998 GB of sample data would be streamed and mixed as played by client control data, on the server, resulting in only a 1-2 MB stream of stereo mix sent down for the resultant performance. This saves local processing, bandwidth, and storage, while also providing audible coverage in real-time for any network latency realized from the start of the control event to the corresponding audio playback.

Preferably, the present system and method for a networked virtual musical instrument allows the server 102 to return the desired musical instrument offset window samples 207, as noted above, to the client 100 in batch or in part as control data is sent 204 and warrants additional samples 207 to complete the entire range of required partial samples or slices 202. Preferably, the client 100 downloads the offset or partial sample slices 207 from the remote sampler server 102 and locally loads, organizes and prepares the samples 202 in memory for synchronized local playback, time-stamping and processing in response to local control data 299.

Preferably, the server 102 loads and queues resultant virtual musical instrument sample segments or "tails" 205 from the database 104, as measured by advancing in each sample file to the point of latency offset window maximum value to the end, and prepare to receive client control data 299 for eventual playback, mix, and stream 218, 232 to the client 100.

Preferably, the present system and method for a networked virtual musical instrument may provide the client to construct four buffers, the first is Buffer A 201, for queuing and sending outbound control data 299 over the network 210 to the server 102. Preferably, the outbound client buffer 201 connects to the inbound buffer of the server, Buffer 209 (which is NOT one of the four buffers constructed by the client 100), over the network 210. Preferably, the client 100 transmits one or more of, but not limited to, the following to the server 102: musical event control data 299, timestamps and current offset window value calculations 203.

Preferably, the present system and method for a networked virtual musical instrument may provide the client 100 to construct the second buffer, Buffer D 230, and a queue 298, for loading and playing the downloaded start, head, or partial sample slices 202 in service of covering the actual latency offset window gap. The queue 298 plays local start samples (downloaded from the server) 226 in real time in response to the same, and sends the buffered initial control event data 212 to the internal throttling buffer, Buffer D 230, for synchronization, mixing, and/or dovetailing with the end samples 222. The timestamp data 287 may be streamed alongside the start samples 228 to form the basis for the client head sample synchronization with the server tails (also called tail samples or end samples) 222 stream 232.

Preferably, the present system and method for a networked virtual musical instrument may allow, instruct, or provide the client 100 to construct a third buffer, Buffer E 234, for receiving the incoming sampler server end/tail samples 222 from stream 232, the second Buffer D 230 for receiving the internally streamed start (head) samples 226, and a fourth buffer, Buffer F 236, for mixing, queuing, and synchronization against latency. Buffers D, E, and F 230, 234, 236, make up the innovative triple-buffer solution to maintaining performance consistency with no audible latency. While actual latency may fluctuate, the main offset window calculation 308 does not. The various client and server buffers 201, 209, 224, 230, 234, 236 are responsible for maintaining the overall offset window, and throttling the local and server streams to dovetail within the acceptable window. Each event and stream may be dynamically buffered, throttled, truncated, or advanced to continuously achieve this result.

Preferably, the client 100 utilizes its buffers 201, 230, 234, 236 to compensate for the latency offset window and actual experienced network latency, thus ensuring zero-latency when dovetailing the local head sample 226 stream 228 with the incoming server tail samples 222 stream 232. The process is one of throttling and dovetailing the various data streams using the buffers. As the musical control data events 299 on the client 100 are triggered on the digital musical instrument(s) 200, the client 100 simultaneously transmits time stamped event data 290 to the server 102 and stream time stamped start samples 202, 226 internally to the throttle buffer, Buffer D 230. The client throttle Buffer D 230 begins to audibly play the start samples for their entire duration on the local device 244. As they play, the control data 299 is transmitted to the server 102 where it triggers the tail (advanced) samples 205 in real-time. As those tail samples 216, 222 are processed 214, 220 on the server 102 and streamed 232 down to the client by Buffer C 224, the incoming client buffer 234 accepts the server stream 232 and queues it until the corresponding first head and tail sample timestamp alignment is reached. With exact precision, once that initial offset threshold is met, the throttle buffer 236 releases the queued (buffered) server stream (234), dovetailing and mixing it with the ensuing balance of local start samples 226. The new mix of perfectly synchronized start and end or head and tail samples 240 is resampled and streamed out of the final buffer 242 to the local device audio output 244 as a zero-latency mix of the full performance 246.

If the latency is shorter than the offset window (i.e. the tail samples get their sooner, or rather that they appear sooner in the stream 232 then the throttle buffer 236 advances the queue and buffer 236 aligns the heads with the tails and releases 238 the new resampled mix 240.

If the physical network or programmatic (contention, bottlenecks, etc.) latency grows or shrinks on either the client 100 or server 102 side, putting the streams 228, 232 of local heads and server tails out of alignment, then the throttle buffer 236 will either queue or strip/advance either peer buffer streams 230, 234 as necessary to achieve re-alignment (audibly) while always maintaining the rhythmic pulse integrity of the original control event timestamps. This musical integrity is a key differentiation from current systems and prioritizes interactive musicality over the kind of buffer stability a streaming video or MP3 song would require.

Preferably, the client 100 transmits musical control data 299 consisting of MIDI or other events such as notes, duration, velocity, expression, pitch bend, sustain pedal and other techniques, control event timestamp data and optionally, the currently calculated latency offset value 308, to the server 102 over the API 204.

Preferably, the client 100 may locally stream and begin playback of local samples with control data timestamp to the internal queue buffer. Preferably, the server 102 accepts the incoming client control data, timestamps and latency offset values and begins to load, process, playback, mix, and stream the real-time, but offset performance of tail samples 206, 216, 222 as designated control data parameters, appending original client control event timestamp to the new mix for synchronization, to the outgoing server buffer 224.

Preferably, the server buffer 224 may queue and transmit 232 the mixed tail samples 222 as a single stereo or multichannel data/metadata audio stream 232 along with original timestamp metadata back to the local client incoming buffer 234, across the network. The client's incoming socket buffer 234 receives the server stream 232 and timestamp metadata, queuing up for the client throttle buffer 236.

Preferably, the client throttle buffer 236 compares the active or upcoming local head sample stream/buffer 228/230 and corresponding control data timestamps with the incoming, queued server tail sample stream/buffer 232/234 and corresponding initial control data timestamps and determines whether to buffer, throttle, or mix and play out the dovetailed streams 238 (like a zipper) to produce a final, seamless and zero-audible-latency output from the initial control data event 246. As stated, if the timestamps are aligned, the combined streams will flow. If the latency changes result in misaligned offset window timestamps, the throttle buffer 236 will queue, strip or advance either buffer 230, 234 to realign and dovetail (sync'd by offset by the window) maintaining musically rhythmic integrity above stream or note consistency. If the throttle buffer 236 is not precise, the local start samples 226 would remain in perfect time, but chop off as the tail sample stream 222 would fall behind, build up or queue up latently, or step on the start samples by beginning too soon in their natural musical lifecycle within the dovetailed mix.

In the end, the present system and method for a networked virtual musical instrument ideally allows the client to buffer, stream, playback, or process the complete zero audio latency mix in real-time from the corresponding MIDI 200 data control events.

Preferably, the present system and method for a networked virtual musical instrument may support both the client and the server to execute the combined interactive performance polyphonically across multiple notes or layers concurrently. As each new note is played, the musical integrity of the disparate note, sample and stream relationships persist, including layered sounds, complex techniques, crossfades, round-robin samples (multiple samples per note based on technique or randomness) or other concurrent, sequential or delayed musical performances. In all situations, the throttle buffer system supports the majority of the processing and storage to remain on the server while the client experiences immediate interactive performance and seamless, zero-audible latency playback.

In addition to live, real-time, zero-latency performance and streaming of the virtual sampled instruments on the server, the present system and method for a networked virtual musical instrument may also allow the client to have the ability to download the entire digital music instrument sample or library content 420 for complete client control, performance or playback without further communication with the remote server sampler or traversal of the network. In this scenario, the client simply selects to download all of the instrument or library and proceeds to pull the entire sample set (heads, tails, scripts, metadata) to the local client. In this scenario, the local client ignores the latency calculation and outgoing buffer, instead streaming the entire locally-stored sample set (heads, tails) laterally to the internal throttle buffer which does not wait for a server stream and simply plays the entire (local) mix in real-time out of the local audio output device 244, 324. There is no remote server contribution to this scenario beyond the initial download of the full sample set.

In all scenarios, the present system and method for a networked virtual musical instrument provides users of the system a variety of methods to generate musical control event data. Both human and programmatic/AI users can generate control data through devices 200 such as MIDI keyboards, digital musical instruments, 'qwerty' keyboards, expressive gestures or stimulus, mobile devices, wearables, optical or audible sensors, textual or numeric data, metadata or other inputs. In these scenarios, the system flow is identical except for the fact the final audible output may be experienced by a proxy device such as a wearable, headphones or other device or program, which may introduce its own latency outside of the scope of this disclosure.

Preferably, the present system and method for a networked virtual musical instrument may provide users of the system a variety of methods to generate musical control event data via an open API (application program interface) for use by non-human actors, such as gaming platforms, websites, web services, apps, mobile devices, virtual reality platforms, artificial intelligence (AI) programs, other local or networked platforms, devices or applications, wearables, smart devices, vehicles, structures, wired or wireless networks, protocols or other programs, code, data or metadata. In these scenarios, the system flow is identical to that described herein except for the fact the final output may not be audible, but rather a zero-latency consumption of the final throttled performance mix by a game or program for synchronized multimedia (game score, video soundtrack, live accompaniment, etc.).

Figure 3A:
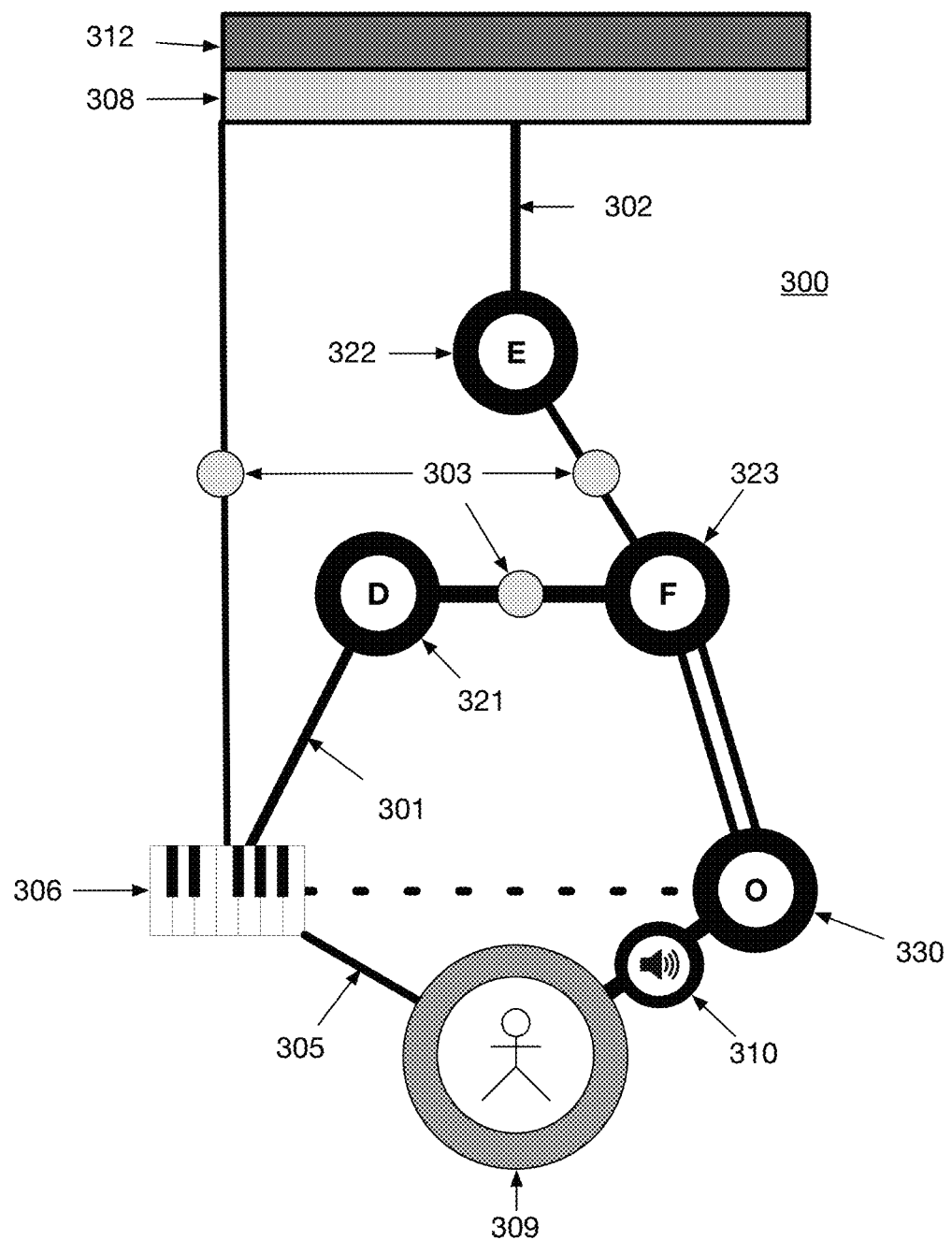
FIG. 3A is an illustration of one embodiment of the virtual musical instrument system and shows the process detail of the triple buffer system.

FIG. 3A is an illustration of one embodiment of the virtual musical instrument system and shows the process detail by which the triple buffer system 300 utilizes the comparison of contiguous local start samples 301 (also referred to as the start stream) and subsequent remote streamed tail samples 302 (also referred to as the tail stream), sample timestamps 303, as defined by initial trigger 305 via input or keyboard 306 and the desired detached and computed latency offset 308, to merge and align said complimentary sample streams and maintain musical and rhythmic integrity from an aural output perspective. This aural continuity is experienced by the player/listener 309 as one seamless, zero-latency tone 310, or group of rhythmically accurate and musically contiguous polyphonic tones from the moment of listener/player's 309 initial key press or control data entry and transmission 305 and timestamp 303. When the actual network latency 312 ebbs or flows (decreases, increases, slows down, speeds up, etc.) in unpredictable or erratic fashion, the triple buffer or throttle system 321, 322, 323 ensures zero-latency rhythmic integrity first and continuous sonic integrity second, to ensure a musically aligned performance by either advancing or buffering the streaming queues aligned to the pattern of the initial control data time stamps.

The first buffer D 321 (which is Buffer D 230 in FIG. 2) triggers and streams the combined start samples stream 301 as initiated by the player or control data, laterally, to the third buffer F 323 (which is Buffer F 236 in FIG. 2) for alignment and streaming to the audio output or ensuing mix, plugin or next stage processing 330, by time stamp 303, according to the detected and computed latency offset 308. The second buffer 322E (which is Buffer E 234 in FIG. 2) receives the incoming server stream 302 of mixed tail notes/tones and prepares it for consumption by the third buffer 323 according to corresponding timestamps 303, for alignment with the local start sample stream 301 from the first buffer 321. The third buffer aligns and throttles the two complimentary streams 301, 302 for continuous and rhythmically accurate output to the audio device, plugin, or mix 310, or next stage processing 330 according to the shared timestamps and computed latency offset 308.

Alignment of polyphonic performances of multiple notes or multiple streams adhere and align to the same zero-latency and rhythm-first model across multiple streams with the same musical and aural integrity in cases of early, late or ideally congruent transmission, processing, latency and buffer/advance alignments.

Figure 3B:
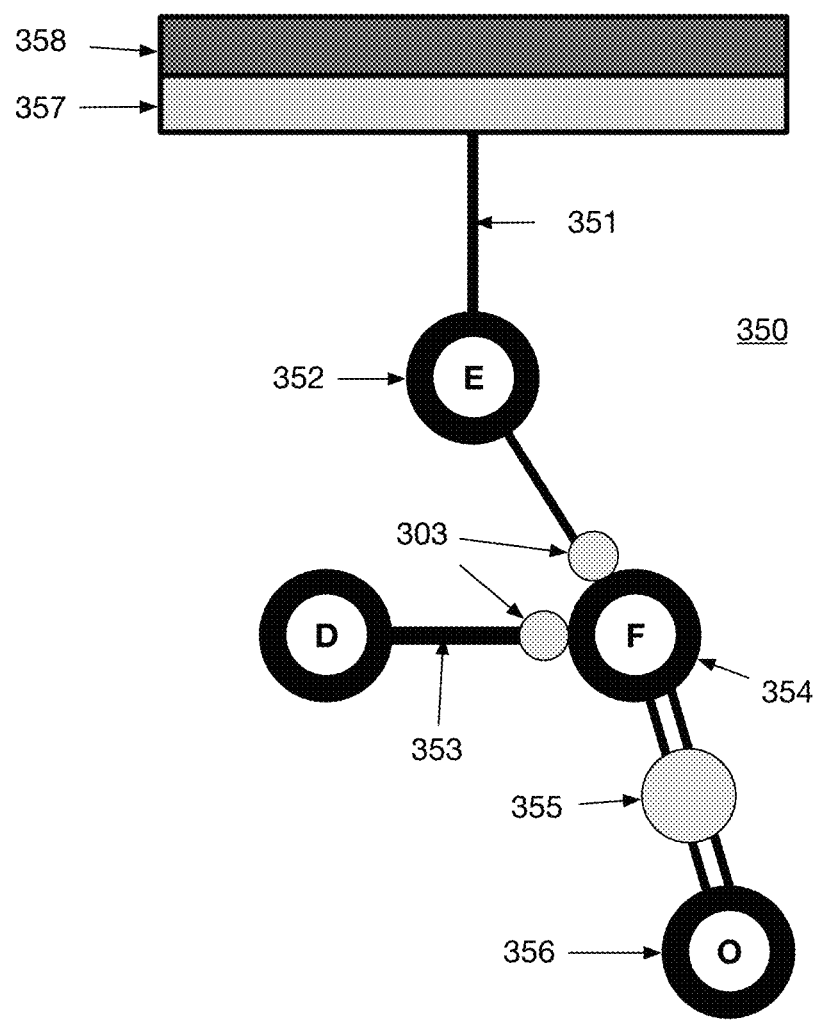
FIG. 3B is an illustration of one embodiment of the virtual musical instrument system and shows a best-case scenario for buffering.

FIG. 3B is an illustration of one embodiment of the virtual musical instrument system and shows a best-case scenario 350. FIG. 3B shows that the server tail stream 351 arrives at the second buffer E 352 (which is Buffer E 234 in FIG. 2) right before the end of the corresponding start sample stream 353 and is aligned by the third buffer F 354 (which is Buffer F 236 in FIG. 2). The resultant merged stream 355 is directed to the audio output, plugin or next stage processing 356 from the third buffer F 354 with minimal buffering or processing. In this scenario, the actual transmission and processing latency 358 of the start and tail sample streams closely matches the overall anticipated, detected and computed latency 357 from initial control event to audible output.

Figure 3C:
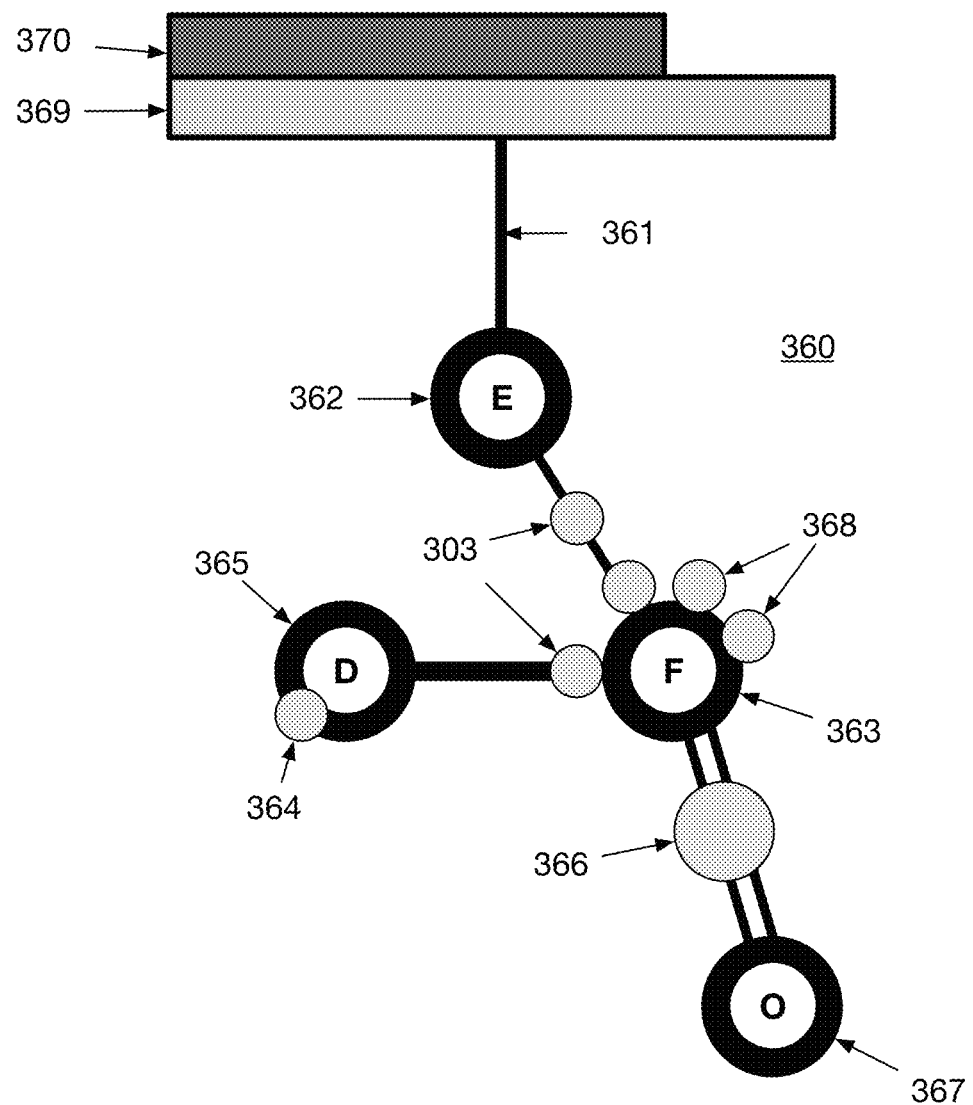
FIG. 3C is an illustration of one embodiment of the virtual musical instrument system and shows a server/connection that is faster than expected.

FIG. 3C is an illustration of one embodiment of the virtual musical instrument system and shows a server/connection faster than expected scenario 360. When the actual transmission and processing latency 370 of the server tail stream 361 is faster than the anticipated, detected and computed latency offset 369, the server tail stream 361 may be buffered 368 by either the second buffer E 362 (which is Buffer E 234 in FIG. 2) or the third buffer F 363 (which is Buffer F 236 in FIG. 2) to wait until it aligns with the end of the corresponding start sample stream timestamps 364 as streamed laterally from the first buffer D 365 (which is Buffer D 230 in FIG. 2). The managed buffering ensures total alignment as well as musical and rhythmic continuity between the corresponding start and tail sample streams. The resultant sequenced stream 366 flows from out from the third buffer F 363 to the ensuing audio output, plugin, or next stage processing 367.

Figure 3D:
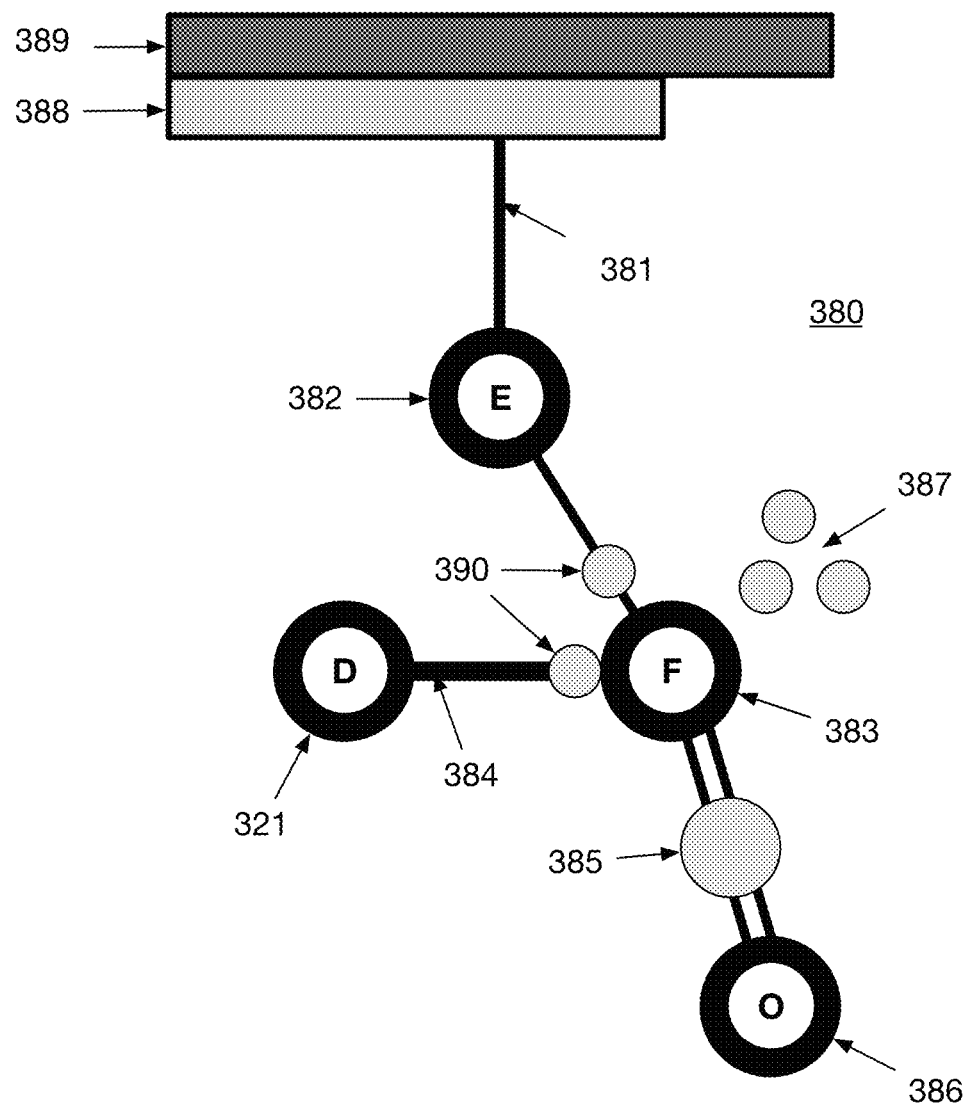
FIG. 3D is an illustration of one embodiment of the virtual musical instrument system and shows a server/connection is slower than expected.

FIG. 3D is an illustration of one embodiment of the virtual musical instrument system and shows a server/connection slower than expected scenario 380. The actual transmission and processing latency 389 of the server tail stream 381 exceeds the overall anticipated, detected, and computed latency offset 388, for reasons of actual network issues, server processing degradation, lost data, or any other reason, resulting in a gap between the start and end sample streams. In this case, the second buffer E 382 (which is Buffer E 234 in FIG. 2) or the third buffer F 383 (which is Buffer F 236 in FIG. 2) will skip, discard or advance the stream data 384 programmatically (as opposed to delaying it) to properly align the next appropriate tail sample stream segment 381 with next available sample time stamp 390 of the incoming, corresponding local start samples 384. In this scenario, audible continuity is sacrificed for rhythmic continuity, ensuring that the third buffer F 383 and the audio output does not suffer a delayed backlog of tail sample stream data that must catch up, thus destroying the real-time rhythmic integrity of the overall performance output. The resultant, re-aligned start/end sample stream 385 from the third buffer F 383 is subsequently sent to the audio device, plugin, mix, or next stage processing 386.

Virtual Musical Instrument Interface, Security And Commerce

Figure 4:
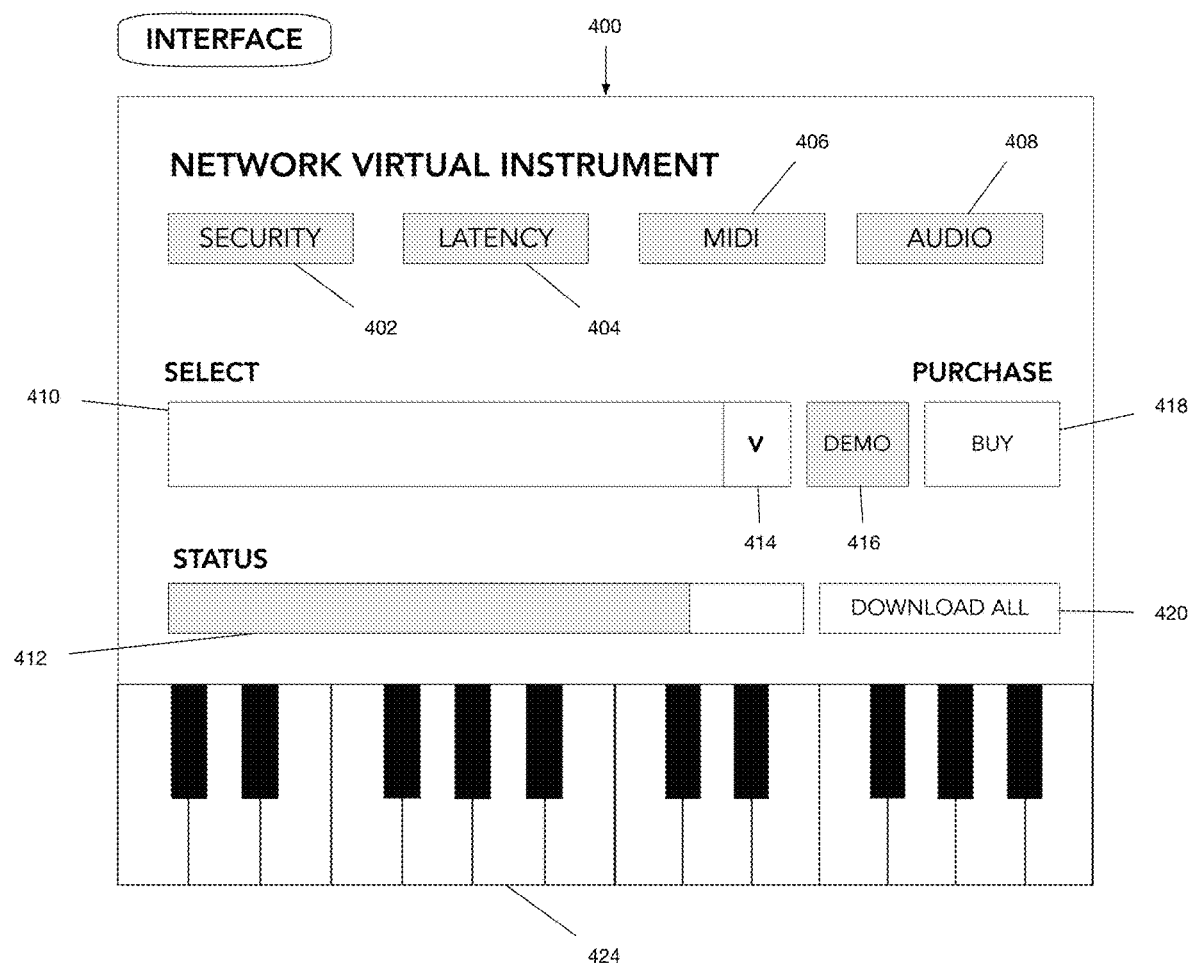
FIG. 4 is a diagram of one embodiment of virtual musical instrument system and shows a preferred client interface to (1) select, purchase, subscribe or demo, secure, and protect networked virtual musical instruments, (2) emit musical control data, and (3) experience the seamless, zero-latency audio performance in real-time.

FIG. 4 is a diagram of one embodiment of virtual musical instrument system and shows a preferred client interface to (1) select, purchase, subscribe or demo, secure, and protect networked virtual musical instruments, (2) emit musical control data, and (3) experience the seamless, zero-latency audio performance in real-time. As shown in FIG. 4, the present system and method for a networked virtual musical instrument may provide the client an interface 400 to select 410, preview, purchase, subscribe to and perform some or all of the functions, virtual musical instruments or resultant content as detailed in the aforementioned objects and methods. A user preferably chooses and performs a digital musical instrument in real-time, with zero latency, across the network. If satisfied with the experience, they may be prompted to purchase the musical instrument for permanent ownership or periodic subscription for continued access. This commerce event may result in continued real-time performance streaming of the networked virtual musical instrument or a full download of the sample, bypassing the network and latency throttling functions. In either case, the user is prompted to complete the commerce event and post verification, authentication and authorization, is afforded one time or ongoing access to the system and method for a networked virtual musical instrument functionality from one or more of their authorized devices.

Preferably, in the commerce flow or any other use of the system and method for a networked virtual musical instrument, the remote server retains and enforces its ability to secure, protect, encrypt, prevent, and authorize access to the server or client sampler instruments, control data, streams or content as detailed in the aforementioned objects and methods. By authorizing a client to be able to a) connect to the server and select instruments, b) download and utilize head/start corresponding, samples, author and transmit control data to the server, receive and buffer incoming tail/end sample streams, and throttle/dovetail, mix and treat out the resultant full performance mix in real-time, the system server maintains multiple points of control over the network virtual musical instrument experience.

Ideally, the system and method for a networked virtual musical instrument provides the musician user a local interface 400 (display, keyboard, touch screen, or the like) or API offer the following services/options, including, but not limited to: instrument navigation and selection (entry field 410, drop down menu 414), operation, configuration and performance of the remote server virtual musical instrument 424, including security authorization 402, latency status 404, control event data 406, and audio streaming 408 status. In addition, the system and method for a networked virtual musical instrument interface ideally provides status on start/head sample downloads or streaming 412, and the ability to download all instruments or samples 420.

Preferably, additional metadata accompanies control data, samples and streams to along with client and server identification and authentication to enforce access and functionality at the various security points. One example is the ability to demonstrate musical instruments without authorization, but not achieve zero audible latency. Another example is testing virtual musical instruments with zero latency for free, but for a limited time. Another example is permitting endless trials and testing without latency, but for only a limited musical instrument set. Another example is the ability to test, trial, or demo instruments endlessly, without latency, but limit the ability to download the full instruments for use offline without the server's participation. All of these scenarios are uniquely applicable and enforceable by virtue of the new and innovative methods of the present system and method for a networked virtual musical instrument and its ability to deliver a novel approach to truly interactive, zero-latency networked virtual musical instrument.

EMBODIMENTS

Embodiment 1

One preferred embodiment involves a musician on a network-connected device such as a laptop or desktop computer with a DAW application and an attached musical keyboard or MIDI controller, playing a remote cloud-based sampler in real time in service of a musical performance or composition. The musician ideally opens their DAW and selects a plugin instrument track that loads an instance of the system and method for a networked virtual musical instrument. The local instance may connect with the remote sampler server over the Internet, ideally giving the musical options to select a particular virtual musical instrument or library.

Upon selection, the system and method for a networked virtual musical instrument senses and/or determines the actual latency of the system and adjusts both the remote server and the local plugin to enable instant and zero-latency performance. The necessary offset samples are loaded (sent from the server to the client) and the remote server tees up the resultant samples for playback in response to ensuing control data. The musician begins to hit keys and locally hears unbroken, zero-delay audio playback of the notes being played, streamed and mixed/merged with the local offset sample audio rendering locally. With each ensuing note played (or control data sent) the offset window may be constantly adjusted and the remote and local buffers coordinate to continue seamless, zero-latency merged audio playback of the remote and local streams, on the local system.

As the musician starts and stops notes, plays in layers (multiple notes at the same time) or plays expressively (techniques such as legato, staccato, increases/decreases in volume, expression, or cross-fading) the real-time nature of hybrid local/remote performance realization with zero-latency playback is maintained by the system. The musician may also select new or even multiple remote instruments from within the plugin or DAW application and the system and method for a networked virtual musical instrument process repeats with zero latency and real-time audible performance.

Embodiment 2

Another embodiment involves a standalone DAW application on a computing device such as a laptop or tablet configured to play back automatic or pre-recorded MIDI data without the interactive performance of a musician, but rather based on musical control data previously recorded from a human performance input or simply algorithmically generated.

In this embodiment, the local program independently selects a virtual musical instrument or set of instruments on the remote sampler server across the network, calculates and transmits the latency window values, receives and loads the remotely transmitted offset samples and proceeds to stream its programmatic musical control data from memory to the remote server across the network. This results in an immediate, windowed and zero-latency return stream of the resultant audio from the remote server to the local program, synchronized and mixed with the local offset sample stream, for a combined, seamless and zero-latency playback realization of the virtual musical instrument performance as desired.

Embodiment 3

Another embodiment involves an independent program or application, like a game or VR (virtual reality) platform, with either predetermined musical control data or cynically derived control data that may select from a number of virtual digital instruments to sonically realize its data as music in the context of a game, software, VR or mobile experience.

In this embodiment, the local program independently selects a virtual musical instrument or set of instruments on the remote sampler server across the network, calculates and transmits the latency window values, receives and loads the remotely transmitted offset samples and proceeds to stream its programmatic musical control data from memory to the remote server across the network. This results in an immediate, windowed and zero-latency return stream of the resultant audio from the remote server to the local program, synchronized and mixed with the local offset sample stream, for a combined, seamless and zero-latency playback realization of the virtual musical instrument performance as desired.

Embodiment 4

Another embodiment involves a networked web service or server application, device, wearable, mobile phone, tablet or physical apparatus with underlying software required to provide musical cues or underscore to an interactive user or program experience. The programmed or independent software parameters, physical human or digital device interaction ideally drives the creation of musical control data.

This relatively autonomous program independently selects desired virtual musical instruments or sets of instruments on the remote sampler server across the network, calculates and transmits the latency window values, receives and loads the remotely transmitted offset samples and proceeds to stream its programmatic musical control data from memory to the remote server across the network. This results in an immediate, windowed and zero-latency return stream of the resultant audio from the remote server to the local program, synchronized and mixed with the local offset sample stream, for a combined, seamless and zero-latency playback realization of the virtual musical instrument performance as desired for the experience.

Embodiment 5

Another embodiment involves a low-power, low-storage and/or low-bandwidth mobile device or source application such as a piano app or music workstation software designed to proxy musical performance or control data inputted from itself or another mobile device, wearable or fully self-contained musical instrument, communicating by a physical or wireless connection to transmit the performance control data.

In this embodiment, the local device selects a virtual musical instrument or set of instruments on the remote sampler server across the network on behalf of the source application or device, calculates and transmits the latency window values, receives and loads the remotely transmitted offset samples and proceeds to stream its programmatic musical control data from memory to the remote server across the network. This results in an immediate, windowed and zero-latency return stream of the resultant audio from the remote server to the local program, synchronized and mixed with the local offset sample stream, for a combined, seamless and zero-latency playback realization of the virtual musical instrument performance as desired back to or via the original source device or program.

Embodiment 6

Another embodiment involves an e-commerce experience where musicians and composers search for, preview, trial and purchase or subscribe to and play, perform or compose with vast arrays of remote virtual musical instruments from their local device with very low network, bandwidth, processing and storage requirements. Ideally, the musician or composer searches for a desired sound or instrument on the Internet and finds what they seek from a traditional browser search result.

Upon clicking the result, the instrument remotely and locally loads into their DAW, plugin, in-browser or other application via the system and method for a networked virtual musical instrument, negotiates and compensates for latency and instantly responds to play and performance via generated control data with zero latency or audible gaps. Upon approval, the musician can click to purchase the instrument and continue to use it natively in either the streaming or fully downloaded version, if resources permit. In either case, the latency is removed and the musician ideally has the ability to cycle through and trial plethora of remote virtual musical instruments with immediate and non-latent audible results. The increased immediacy and interactivity mixed with high quality and low bandwidth, storage, processing requirements results in a higher satisfaction and more expansive opportunity and inclination to purchase or subscribe to the virtual musical instrument content from a wider array of local devices and applications.

Embodiment 7

Another embodiment involves an artificial intelligence (AI) engine designed to generate or compose musical control data or composition either independently or in response to one or more cues, stimulus, interaction, formulas, algorithms, templates or machine learning such as an auto-scoring technology or auto-soundtrack generation service. While this system and method for a networked virtual musical instrument and embodiment does not encompass those technologies, they do and will require interactive, remote and high quality virtual musical instruments to fulfill their functions on the widest possible devices and network scenarios.

In this embodiment, the local AI program ideally selects a virtual musical instrument or set of instruments on the remote sampler server across the network, calculates and transmits the latency window values, receives and loads the remotely transmitted offset samples and proceeds to stream its programmatic musical control data from memory to the remote server across the network. This results in an immediate, windowed and zero-latency return stream of the resultant audio from the remote server to the local program, synchronized and mixed with the local offset sample stream, for a combined, seamless and zero-latency playback realization of the virtual musical instrument performance as desired.

Embodiment 8

Another embodiment involves collaborative music-making experience among network distributed devices, musicians or composers who seek to interact and perform/compose in real-time across the network with zero latency or delay. In this embodiment, ideally the musicians independently or collectively from their own local devices, open their DAW applications and select a plugin instrument track that loads an instance of the system and method for a networked virtual musical instrument. The local instance connects with the remote sampler server over the Internet, ideally giving the musical options to select a particular virtual musical instrument or library.

Upon selection, the system and method for a networked virtual musical instrument senses the latency and adjusts both the remote server and the local plugin to afford instant and zero-latency performance. The necessary offset samples are loaded and the remote server tees up the resultant samples for playback in response to ensuing control data. The musicians begin to hit keys and locally hear unbroken, zero-delay audio playback of the notes being played, streamed and mixed/merged with the local offset sample audio for local rendering. With each ensuing note played (or control data sent) the offset window constantly adjusted and the remote and local buffers coordinate to continue seamless, zero-latency merged audio playback of the remote and local streams, on the local system. As the musician starts and stops notes, plays in layers (multiple notes at the same time) or expressively (techniques such as legato, staccato, increases/decreases in volume, expression, or cross-fading) the real-time nature of hybrid local/remote performance realization with zero-latency playback is maintained.

The musician may also select new or even multiple remote instruments from within the plugin or DAW application and the system and method for a networked virtual musical instrument process repeats with zero latency and real-time audible performance. In addition to their own musical performances, the system and method for a networked virtual musical instrument allows for other musical performances from other local devices/musicians to be heard by one or all musicians on their respective local devices in real-time, with zero latency from the moment the performer created their respective control data. This embodiment results in a true, real-time collaborative musical performance across the network via remote virtual musical instruments that is seamless, synchronized and without audible latency.

Embodiment 9

Another embodiment involves a commercial musical composition, recording, video, game, song, soundtrack, VR, mobile or other software program or digital content whose musical score is dynamically generated and protected or authorized by copyright and rights management security. In this embodiment, ideally digital content is hosted or broadcast on a service such as YouTube, Vimeo or Facebook, or a local device such as a DVD, BluRay or set-top display (Smart TV).

As the content is broadcast to an authorized user or viewer/listener, the corresponding musical accompaniment subsequently authorized and provided via the system and method for a networked virtual musical instrument program interface as described in numerous embodiments above. If the user or viewer(s) remain authorized, the zero-latency content audio streams dynamically without the vulnerability to capture, replay or hack. If the user or content becomes unauthorized, downloaded or captured, the accompanying musical score will not be authorized, realized or streamed, thus ensuring the sanctity of the rights management.

Embodiment 10

Yet another embodiment involves a public or private space such as a theater, nightclub, shopping center, store, auditorium, school, university, sports complex, cinema, outdoor venue, office, factory, bar, restaurant, hospital, vehicle or common area with constant stream of generated but authorized music. If so authorized, the musical content would be provided via the system and method for a networked virtual musical instrument program interface as described in numerous embodiments above. If the venue remains authorized, the zero-latency content audio streams dynamically without the vulnerability to capture, replay or hack. If the user or content becomes unauthorized, downloaded or captured, the accompanying interactive musical score will not be authorized, realized or streamed, thus ensuring the integrity of the rights management.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

The foregoing description of the preferred embodiment has been presented for the purposes of illustration and description. While multiple embodiments are disclosed, still other embodiments will become apparent to those skilled in the art from the above detailed description. These embodiments are capable of modifications in various obvious aspects, all without departing from the spirit and scope of protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed is:

1. A virtual musical instrument system, comprising:
    a server; and
    a client;
    wherein said server and said client are linked via a network;
    wherein said server comprises a database;
    wherein said database comprises one or more virtual musical instrument samples;
    wherein said client comprises: a user interface; a musical control event input device; a first client buffer; a second client buffer; a third client buffer; a fourth client buffer; and a local audio device;
    wherein said musical control event input device is configured to allow a user to select a first virtual musical instrument sample from said one or more virtual musical instrument samples;
    wherein said first virtual musical instrument sample comprises one or more samples that are divided by said server into one or more start samples and one or more end samples;
    wherein said server sends said one or more start samples to said client in response to said user selecting said first virtual musical instrument sample;
    wherein said musical control event input device is configured to allow said user to generate control event data that is processed by said client;

wherein said client queues and sends said control event data over said network to said server and wherein said server processes said control event data and sends said one or more end samples, to said client; and wherein said client is configured to process said one or more start samples and said one or more end samples, such that they are synchronized and streamed to said local audio device, such that a zero-latency final interactive performance is delivered by said local audio device based on said control event data wherein said first client buffer initially processes said control event data and sends said control event data to said server;

wherein said first client buffer also (1) accepts from said server said one or more start samples and (2) sends said one or more start samples to said second client buffer;

wherein said second client buffer accepts said one or more start samples and queues them to be sent to said fourth client buffer;

wherein said third client buffer accepts said one or more end samples and queues them to be sent to said fourth client buffer;

wherein said fourth client buffer (1) accepts said one or more start samples and said one or more end samples, and (2) mixes and synchronizes the samples to create a combined server playback stream that is outputted by said local audio device; and wherein said combined server playback stream is a fully expressive and interactive musical performance with zero audible latency.

2. The virtual musical instrument system of claim 1, wherein said musical control event input device is a MIDI keyboard.

3. The virtual musical instrument system of claim 1, wherein said musical control event input device is selected from the group of devices consisting of one or more of the following: digital musical instruments; physical keyboards, devices that capture expressive gestures; virtual reality input devices; mobile devices; wearables; optical sensors; audible sensors; and text input devices.

4. The virtual musical instrument system of claim 1, wherein said local audio device is one or more audio speakers.

5. The virtual musical instrument system of claim 1, wherein said client calculates an initial latency between said client and said server over said network;

wherein said client calculates an offset window value, which is greater than said initial latency; and wherein said server uses said offset window value to determine relative sizes of said one or more start samples and said one or more end samples.

6. The virtual musical instrument system of claim 5, wherein at various times during said combined server playback stream that is outputted, said client calculates a current latency between said client and said server over said network in order to determine if said offset window value needs to be recalculated.

7. The virtual musical instrument system of claim 6, wherein said offset window value informs all communications between said client and said server to allow said first client buffer, said second client buffer, said third client buffer, and said fourth client buffer in queuing and synchronization of said one or more start samples and said one or more end samples.

8. The virtual musical instrument system of claim 7, wherein said client transmits to said server said initial latency, said current latency, and a plurality of timestamps.

9. The virtual musical instrument system of claim 8, wherein said plurality of timestamps are used by said buffers in queuing and synchronization of said one or more start samples and said one or more end samples.

10. A method for performing networked virtual musical instruments in real-time with zero latency, comprising the steps:

providing a server, said server comprising a virtual musical instrument sampler application and a database comprising one or more virtual musical instrument samples;

wherein said server comprises two or more server buffers configured to manage control event data that comes in and a plurality of audio data that goes out;

providing at least one client, said client comprising: a first client buffer; a second client buffer; a third client buffer; a fourth client buffer; a user interface; a musical control event input device; and a local audio device;

wherein said server and said client are in communication over a network;

wherein said musical control event input device is configured to allow a user to select a first virtual musical instrument sample from said one or more virtual musical instrument samples;

wherein said first virtual musical instrument sample comprises a plurality of start samples and a plurality of end samples;

wherein said musical control event input is configured to allow said user to generate said control event data;

processing said control event data by said first client buffer;

sending said control data by said first client buffer to said two or more server buffers; and synchronizing, throttling, and mixing said plurality of audio data for zero-latency playback by said second, third, and fourth client buffers;

calculating a latency between said client and said server over said network as a time taken to send a standard packet of data between them;

calculating an offset window value, which is greater than said latency;

loading by said server a desired portion of said first virtual musical instrument sample based on said offset window value;

segmenting a plurality of sample slices of said first virtual musical instrument sample into a plurality of start samples and a plurality of end samples based on said offset window value;

loading and queuing said plurality of end samples by said two or more buffers returning said plurality of start samples to said client;

receiving by said first client buffer said plurality of start samples;

sending by said first client buffer said plurality of start samples to said second client buffer;

accepting and queuing by said second client buffer said plurality of start samples;

sending by said two or more server buffers said plurality of end samples;

accepting and queuing by said third client buffer said plurality of end samples;

sending by said third client buffer said plurality of end samples to said fourth client buffer;

accepting by said fourth client buffer said plurality of start and end samples;

mixing and synchronizing said plurality of start and end samples by said fourth client buffer to create a combined server playback stream that is outputted by said local audio device; and wherein said combined server playback stream is a fully expressive and interactive musical performance with zero audible latency.

11. The method for performing networked virtual musical instruments in real-time with zero latency of claim 10, wherein said control event data comprises a plurality of timestamps; and wherein said plurality of timestamps are returned with said plurality of start and end samples, such that said first, second, third, and fourth client buffers use said plurality of time stamps to queue, throttle, mix, and synchronize said plurality of start and end samples create said combined server playback stream.

12. The method for performing networked virtual musical instruments in real-time with zero audible latency of claim 11, wherein both said client and said server are configured to process polyphonic control data.

13. The method for performing networked virtual musical instruments in real-time with zero audible latency of claim 11, wherein said server is configured to secure, protect, encrypt, constrain, and enforce access restriction to said client and said database.

14. The method for performing networked virtual musical instruments in real-time with zero audible latency of claim 11, further comprising the step;

downloading said first virtual musical instrument sample in its entirety to said client, such that said client may play said first virtual musical instrument without further communication with said server.

15. The method for performing networked virtual musical instruments in real-time with zero audible latency of claim 11, further comprising the steps;

re-evaluating said latency and recalculating said offset window value in real-time.

16. The method for performing networked virtual musical instruments in real-time with zero audible latency of claim 11, wherein said control event data is generated by said user physically inputting commands on said musical control event input device.

17. The method for performing networked virtual musical instruments in real-time with zero audible latency of claim 11, wherein said control event data is generated by an application program interface providing commands to said musical control event input device.

* * * * *